United States Patent [19]

Blizzard

[11] Patent Number: 4,865,911

[45] Date of Patent: Sep. 12, 1989

[54] CURABLE SILICONE COATED GASKET AND COMPOSITION

[75] Inventor: John D. Blizzard, Bay City, Mich.

[73] Assignee: Dow Corning Corporation, Midland, Mich.

[21] Appl. No.: 294,451

[22] Filed: Jan. 9, 1989

[51] Int. Cl.$^4$ .............................................. B32B 15/00
[52] U.S. Cl. .................................... 428/285; 428/287; 428/290; 428/429; 428/447; 524/860; 524/861; 524/866; 525/31; 525/32
[58] Field of Search ............... 525/31, 32; 524/860, 524/861, 866; 428/266, 447, 285, 287, 290, 429

[56] References Cited

U.S. PATENT DOCUMENTS

| | | | |
|---|---|---|---|
| 2,956,908 | 4/1956 | Brownback | 117/167 |
| 3,453,228 | 7/1969 | Metevia et al. | 260/37 |
| 4,322,518 | 3/1982 | Blizzard | 528/15 |
| 4,355,068 | 10/1982 | Beyer et al. | 428/290 |

Primary Examiner—James J. Bell
Attorney, Agent, or Firm—Jim DeCesare

[57] ABSTRACT

A gasket of a nonwoven sheet material, and a coating composition on at least one side of the nonwoven sheet material. The coating composition is a reaction product of a vinyl functional polydimethylsiloxane, a trimethylsiloxy silica terpolymer, a reactive diluent, and a catalyst. The reactive diluent can be a methyl vinyl cyclic siloxane having the formula (MeViSiO)$_n$ wherein n is an integer of from three to five, Me is methyl, and Vi is vinyl.

33 Claims, No Drawings

CURABLE SILICONE COATED GASKET AND COMPOSITION

BACKGROUND OF THE INVENTION

This invention relates to a gasket material, and more particularly, to an automotive gasket of a paper base material bearing a coating of a silicone material.

A gasket is a deformable layer of packing material that is designed to be firmly held between at least two contact surfaces having a joint intended to be sealed with the gasket in order to prevent leakage from the joint. The basic function of a gasket is to fill the space between two imperfect faces sought to be joined in a fluid tight relationship. The use of a gasket eliminates the need for costly finishing of the faces which would otherwise be necessitated. Gaskets are manufactured in many varied shapes and sizes but in general are flat thin materials which can be compressed. They can be constructed of natural or synthetic rubber, felt, cork, vegetable fiber, paper, asbestos, plastic, and soft metallic materials such as lead and copper. The gasket may be employed in service in duties ranging from the prevention of leakage of liquids, to the rendering of certain joints to be gas tight such as high temperature engine exhaust manifolds. The ideal gasket is a resilient predictably compressible composition of one or more materials which conforms easily to joint surface irregularities, and which can compensate for joint distortion during operation and thermal fluctuations.

For most applications, the gasket material alone is not sufficient to form a seal due to the many voids and channels that exist in the material. It has therefore become common practice to incorporate additives and impregnants into the gasket material such as fillers, binders, sealants, and saturants, of varied and complex description, in an attempt to compensate for these voids and channels, thereby rendering the gasket material to be more leak proof.

For example, representative of additives and impregnants which have been used in the past are glue, grease, wax, rubber such as styrene-butadiene, plastics, phenolic resins, elastomers such as chloroprene, nitriles, and fluoroelastomers, and silicones. Thus, in U.S. Pat. No. 2,956,908, issued Oct. 18, 1960, there is described a gasket matrial specific to automotive vehicle application and wherein there is included as a coating thereon a mixture of a silicone fluid and castor oil. A mixture of chrysotile asbestos and a heat curable siloxane elastomer is taught in U.S. Pat. No. 3,453,228, issued July 1, 1969, although the use of such material as a gasket is not specifically disclosed. However, a cylinder head gasket including a silicone rubber binder is shown in U.S. Pat. No. 4,355,068, issued Oct. 19, 1981.

Thus, it should be apparent that the use of silicone materials in gaskets is not new. What is new, however, and covered by the present invention, is a coating for a gasket material having improved water resistance.

SUMMARY OF THE INVENTION

This invention relates to a gasket of a nonwoven sheet material, and a coating composition on at least one side of the nonwoven sheet material. The coating composition is a reaction product of a vinyl functional polydimethylsiloxane, a trimethylsiloxy silica terpolymer, and a reactive diluent.

The invention also relates to a method of rendering a gasket leak resistant in which a gasket is formed from a nonwoven sheet material. There is applied to at least one side of the nonwoven sheet material a coating composition, and the coating composition is the reaction product of a reactive diluent and a curable silicone composition which comprises a resinous polymeric siloxane containing silicon-bonded hydroxyl radicals and consisting essentially of $R_3SiO_{\frac{1}{2}}$ siloxane units and $SiO_{4/2}$ siloxane units wherein the ratio of the number of said $R_3SiO_{\frac{1}{2}}$ siloxane units to the number of said $SiO_{4/2}$ siloxane units has a value of from 0.6/1 to 0.9/1 and each R denotes, independently, a monovalent hydrocarbon radical, an organohydrogenpolysiloxane wherein each organic radical is, independently, a monovalent hydrocarbon radical, there being an average of at least one silicon-bonded hydrogen radical per molecule of said organohydrogenpolysiloxane, and a polydiorganosiloxane having the formula $$ZR'''_2SiO(R'''_2SiO)_cSiR'''_2Z$$ 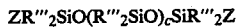

wherein Z denotes hydroxyl or R''' and each R''' denotes independently, a monovalent hydrocarbon radical, there being an average of at least two vinyl radicals or silicon-bonded hydroxyl radicals per molecule and c has a value sufficient to provide a viscosity of from 0.1 to 10,000 Pa.s at twenty-five degrees Centigrade for the polydiorganosiloxane.

In a preferred embodiment of the present invention, the reactive diluent is a vinyl cyclic siloxane having the formula $(QViSiO)_n$ wherein n is an integer of from three to five, Q is methyl, phenyl, or hexenyl, and Vi is vinyl. The reactive diluent may include combinations of vinyl cyclic siloxane trimer, tetramer, and pentamer. The ratio of the vinyl component of the coating composition to silica can be 1:3, and the coating composition has a viscosity less than about one thousand centipoise measured at twenty-five degrees Centigrade; or the coating composition can have a viscosity less than about four hundred centipoise measured at twenty-five degrees Centigrade; or the ratio of the vinyl component of the coating composition to silica can be 3:1, and with the viscosity of the coating composition being in excess of about five thousand centipoise measured at twenty-five degrees Centigrade.

In some additional more specific embodiments of the present invention, there is provided the step of coating one or both sides of the nonwoven sheet material with the coating composition and the step of curing the coated nonwoven sheet material. The coated and cured nonwoven sheet material may then be heat aged for a predetermined period of time. Preferably, the coated, cured, nonwoven sheet material contains from about one to about fifteen percent by weight of the coating composition based on the total weight of the gasket nonwoven sheet material.

It is therefore the object of the present invention to provide a nonwoven sheet material that can be used as a gasket for automotive vehicle applications, and in which the gasket has been so treated in order to render the material more resistant to fluid leakage than has been heretofore possible with prior art treatment techniques.

These and other features, objects, and advantages, of the herein described present invention will become more apparent when considered in conjunction with the following detailed description thereof.

DETAILED DESCRIPTION OF THE INVENTION

In the present invention, there is provided a silicone saturant automotive gasket coating. A nonwoven base paper is employed to form the gasket, and with the silicone composition of the present invention coated thereon, and preferably cured. The thusly coated gasket possesses improved water resistance. Saturation of the nonwoven base paper with the heat curable silicone composition of the present invention also results in improved resistance of the gasket to oils, fuels, and water-glycol materials including typical automotive antifreeze formulations.

It has been found that prior art gasket coating materials do not penetrate sufficiently into the base material sheet of the finished gasket in order to completely fill the voids and channels that exist in the base sheet. Such prior art materials further have not provided a complete seal but allow wicking and bleeding of many materials such as antifreeze formulations, which result in migration of fluids from the joint sought to be sealed because of the defective coating employed during the manufacture of the gasket. This leakage of fluids not only tends to deplete necessary vehicle fluids, but the leaking fluids form a film on vehicle components which attract dirt and debris.

The compositions of the present invention, however, have been found to penetrate the base material of the gasket to a greater degree than heretofore known in the prior art. This is due to the fact that in formulating the compositions used herein, a reactive diluent provides a product of lower viscosity and hence of better penetration capabilities. The compositions of the present invention exclude fluids to a greater degree both in the uncured and cured states of the compositions, and with a lower viscosity penetrate the base material and fill the various voids and channels. The base material it has been found, should include from one to fifteen, preferably from three to six percent by weight of the composition of the present invention based on the total weight of the base material.

Any type of gasket base sheet material may be employed in accordance with the concept of the present invention. However, the preferred gasket base sheet material is a nonwoven gasket paper which constitutes about ninety-two weight percent of a fiber mat, and about eight weight percent of a nitrile rubber binder. The fiber mat may include polyester fibers, ceramic fibers, polyaramids, fiberglass, cellulosic fibers, or mixtures and combinations thereof. The gasket base sheet material should be saturated with the coating of the present invention in order to insure against leakage and weeping of fluids through the joint being sealed. While described herein as being specific to automobile type usages, the gaskets prepared in accordance with the present invention can be used in any application where a fluid type seal is required such as in equipment, vehicles, aircraft, or machinery.

The composition of the present invention which is used to coat the gasket base sheet is the reaction product of a vinyl functional polydimethylsiloxane, a trimethylsiloxy silica terpolymer, and a reactive diluent. The vinyl functional polydimethylsiloxane and the trimethylsiloxy silica terpolymer are disclosed in U.S. Pat. No. 4,322,518, issued Mar. 30, 1982, the disclosure of which is incorporated herein by reference. This curable silicone composition can be best described as (i) a resinous polymeric siloxane containing silicon-bonded hydroxyl radicals and consisting essentially of $R_3SiO_{\frac{1}{2}}$ siloxane units and $SiO_{4/2}$ siloxane units wherein the ratio of the number of said $R_3SiO_{\frac{1}{2}}$ siloxane units to the number of said $SiO_{4/2}$ siloxane units has a value of from 0.6/1 to 0.9/1 and each R denotes, independently, a monovalent hydrocarbon radical, (ii) or organohydrogenpolysiloxane wherein each organic radical is, independently, a monovalent hydrocarbon radical, there being an average of at least one silicon-bonded hydrogen radical per molecule of said organohydrogenpolysiloxane, and (iii) a polydiorganosiloxane having the formula

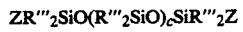

wherein Z denotes hydroxyl or $R'''$ and each $R'''$ denotes independently, a monovalent hydrocarbon radical, there being an average of at least two vinyl radicals or silicon-bonded hydroxyl radicals per molecule and c has a value sufficient to provide a viscosity of from 0.1 to 10,000 Pa.s at twenty-five degrees Centigrade for the polydiorganosiloxane.

The above described curable silicone composition is reacted with a reactive diluent in order to produce the coating compositions of the present invention. The reactive diluent of preference is a methyl vinyl cyclic siloxane having the formula $(MeViSiO)_n$ wherein n is an integer of from three to five, Me is methyl, and Vi is vinyl. The reactive diluent can include combinations of methyl vinyl cyclic siloxane trimer, tetramer, and pentamer. The reaction product of the curable silicone composition and the reactive diluent may be tailored to a variety of formulations including, for example, a formulation hereinafter identified as "Formulation A" wherein the ratio of vinyl polymer to silica is 1:3 and having a viscosity of 940 centipoise measured at twenty-five degrees Centigrade. "Formulation B" of the reaction product of the curable silicone composition and the reactive diluent includes vinyl cyclics but without the vinyl polymer component and has a viscosity of 360 centipoise measured at twenty-five degrees Centigrade. In "Formulation C", the ratio of the vinyl polymer component to the silica is the reverse of Formulation A or 3:1, and with the viscosity of the Formulation C material being 5,160 centipoise measured at twenty-five degrees Centigrade. Obviously, numerous other formulations and combinations are possible within the scope of the present invention.

The following example illustrates the use of the compositions of the present invention.

EXAMPLE I

A compressed automotive gasket material and a highly compressed automotive gasket material were selected for testing. The compressed material is referred to as "soft" in the following Tables whereas the highly compressed gasket material is referred to in the Tables as "hard". Both the soft and hard materials were standard nonwoven gasket paper sheet stock material containing a binder. Formulations A, B, and C, as noted above, were each used to treat each type of sheet stock. A Control sheet stock material containing no coating of the composition of the present invention was employed in each instance. Each of Formulations A-C was drawn down on a gasket sheet stock using a smooth steel Meyer rod. Some samples of the sheet stock of gasket material were coated on one side, while others were coated on both sides of the sheet stock, using each Formulations A-C. Each coated gasket was treated following the coating step, and before the coating was cured, for weight added; water absorption at the end of twenty-four hours at temperatures of twenty-three and sixty degrees Centigrade; tensile strength; and percent elongation. These results are shown in Tables I–II. Each coated gasket was placed in an oven for five minutes and at a temperature of one hundred-fifty degrees Centigrade in order to facilitate the cure the coating in each instance. The cured gaskets were each again evaluated as previously, and in addition, were each further evaluated for the amount of weight loss occurring during the curing process. These results are shown in Tables III–VI. The coated gaskets in Tables III–VI additionally were soaked in the appropriate Formulation for a period of ten minutes. Tables VII and VIII show the results of heat aging of the previously treated and cured gaskets. These coated and cured gaskets were maintained at a temperature of one hundred-fifty degrees Centigrade for seven days and evaluated as previously indicated. This heat aging step was intended to assimilate actual conditions encountered during operation of a typical automobile engine.

TABLE I

COATED HARD GASKET: ONE SIDE UNCURED

| Formulation | % Add-On | % Water Absorption 24 Hrs/R.T. | % Water Absorption 24 Hrs/60° C. | Tensile Strength PSI | Elongation % |
|---|---|---|---|---|---|
| A | 8.7 | 17.3 | 16.3 | 695 | 1.33 |
| B | 5.7 | 16.9 | 17.2 | 467 | 0.67 |
| C | 7.7 | 13.7 | 14.1 | 252 | 5.0 |
| D | 3.9 | 14.9 | 15.4 | 661 | 1.67 |
| Control | | 15.4 | 16.2 | 659 | 9.0 |

TABLE II

COATED SOFT GASKET: ONE SIDE UNCURED

| Formulation | % Add-On | % Water Absorption 24 Hrs/R.T. | % Water Absorption 24 Hrs/60° C. | Tensile Strength PSI | Elongation % |
|---|---|---|---|---|---|
| A | 9.7 | 34.0 | 38.0 | 610 | 2.0 |
| B | 8.0 | 43.9 | 45.3 | 718 | 2.33 |
| C | 6.7 | 41.1 | 44.6 | 739 | 2.0 |
| D | 4.6 | 49.6 | 47.9 | 806 | 2.0 |
| Control | | 71.0 | 75.5 | 786 | 2.0 |

TABLE III

COATED HARD GASKET: ONE SIDE CURED 5 MINUTES @ 150° C.

| Formulation | % Add-On | % Wt Loss | % Water Absorption 24 Hrs/R.T. | % Water Absorption 24 Hrs/60° C. | Tensile Strength PSI | Elongation % |
|---|---|---|---|---|---|---|
| A | 8.7 | 2.3 | 18.3 | 15.7 | 754 | 0.33 |
| B | 5.7 | 1.8 | 18.7 | 15.9 | 434 | 0.33 |
| C | 7.7 | 1.8 | 12.4 | 13.0 | 460 | 3.0 |
| D | 3.9 | 1.9 | 13.8 | 15.3 | 319 | 1.0 |
| Control | | 0.85 | 17.7 | 10.9 | 610 | 6.0 |

TABLE IV

COATED HARD GASKET: BOTH SIDES CURED 5 MINUTES @ 150° C.

| Formulation | % Add-On | % Wt Loss | % Water Absorption 24 Hrs/R.T. | % Water Absorption 24 Hrs/60° C. |
|---|---|---|---|---|
| A | 30.5 | 3.5 | 11.4 | 10.7 |
| B | 31.3 | 3.4 | 11.5 | 9.1 |
| C | 17.3 | 3.7 | 10.8 | 11.7 |
| D | 43.2 | 11.6 | 9.4 | 8.9 |
| Control | | 0.85 | 17.7 | 10.9 |

TABLE V

COATED SOFT GASKET: ONE SIDE CURED 5 MINUTES @ 150° C.

| Formulation | % Add-On | % Wt Loss | % Water Absorption 24 Hrs/R.T. | % Water Absorption 24 Hrs/60° C. | Tensile Strength PSI | Elongation % |
|---|---|---|---|---|---|---|
| A | 9.7 | 2.3 | 34.6 | 34.5 | 795 | 1.0 |
| B | 8.0 | 1.9 | 36.6 | 42.3 | 828 | 0.33 |
| C | 6.7 | 2.3 | 31.2 | 37.6 | 764 | 4.0 |
| D | 4.6 | 2.1 | 22.8 | 29.1 | 845 | 2.0 |
| Control | | 1.2 | 31.5 | 42.1 | 786 | 1.0 |

TABLE VI

COATED SOFT GASKET: BOTH SIDES CURED 5 MINUTES @ 150° C.

| Formulation | % Add-On | % Wt Loss | % Water Absorption 24 Hrs/R.T. | % Water Absorption 24 Hrs/60° C. |
|---|---|---|---|---|
| A | 40.5 | 4.5 | 16.7 | 14.7 |

TABLE VI-continued
COATED SOFT GASKET: BOTH SIDES CURED 5 MINUTES @ 150° C.

| Formulation | % Add-On | % Wt Loss | % Water Absorption 24 Hrs/R.T. | % Water Absorption 24 Hrs/60° C. |
|---|---|---|---|---|
| B | 44.5 | 1.9 | 7.9 | 11.8 |
| C | 16.9 | 4.5 | 13.1 | 17.3 |
| D | 59.0 | 14.2 | 13.7 | 11.8 |
| Control |  | 1.2 | 31.5 | 42.1 |

TABLE VII
COATED HARD GASKET: ONE SIDE CURED 5 MINUTES @ 150° C. HEATED AGE 7 DAYS @ 150° C.

| Formulation | % Add-On | % Wt Loss | % Water Absorption 24 Hrs/R.T. | % Water Absorption 24 Hrs/60° C. | Tensile Strength PSI | Elongation % |
|---|---|---|---|---|---|---|
| A | 8.7 | 1.4 | 8.5 | 10.0 | 95 | 0.0 |
| B | 5.7 | 0.0 | 8.8 | 11.4 | 126 | 0.33 |
| C | 7.7 | 0.8 | 9.3 | 10.7 | 132 | 0.67 |
| D | 3.9 | 0.0 | 8.6 | 11.7 | 184 | 0.0 |
| Control |  | 1.0 | 20.6 | 71.9 | 44 | 0.33 |

TABLE VIII
COATED SOFT GASKET: ONE SIDE CURED 5 MINUTES @ 150° C. HEAT AGED 7 DAYS @ 150° C.

| Formulation | % Add-On* | % Wt. Loss** | % Water Absorption*** 24 Hrs/R.T. | % Water Absorption*** 24 Hrs/60° C. | Tensile Strength PSI | Elongation % |
|---|---|---|---|---|---|---|
| A | 9.7 | 0.6 | 11.8 | 21.4 | 143 | 0.67 |
| B | 8.0 | 0.3 | 12.5 | 22.3 | 185 | 0.33 |
| C | 6.7 | 0.0 | 12.2 | 22.6 | 167 | 0.33 |
| D | 4.6 | 0.0 | 11.4 | 20.0 | 122 | 0.33 |
| Control |  | 1.25 | 16.3 | 73.4 | 710 | 0.0 |

$* = \frac{\text{Wt. After Coating} - \text{Original Wt.}}{\text{Original Wt.}} \times 100\%$ $ = \frac{\text{Wt. Before Coating} - \text{Wt. After Coating}}{\text{Wt. Before Cure}} \times 100\%$ $* = \frac{\text{Wt. After Immersion} - \text{Wt. Before Immersion}}{\text{Wt. Before Immersion}} \times 100\%$ R.T. = Room Temperature or 23° C.

It can be seen from Tables I–VIII that the coated gaskets in the uncured, cured and thermally aged stages improve the water resistance of the gasket material. This is particularly apparent from a study of Tables II and Tables VI–VII. Such improvement in water exclusion rendered by the compositions of the present invention occurs regardless of whether the coating is applied to only one side of the gasket or to both sides thereof. The Tables also clearly indicate that only slight amounts of material is lost during cure, as well as during the heat aging process.

There was also included in the foregoing tests, in addition to the Control, a Formulation "D" which is a composition of an equilibriated blend of dimethyl cyclic siloxanes of the formula $(Me_2SiO)_n$ wherein Me is methyl and n is an integer from three to five, and an alkoxy silane such as methyl trimethoxy silane or phenyl trimethoxy silane, catalyzed with a tetrabutyl titanate transition-type catalyst. Formulation D has a viscosity of the order of about sixty centipoise measured at twenty-five degrees Centigrade.

The following Examples illustrate procedures for making each of Formulations A–D referred to above.

EXAMPLE II (Formulation A)

A mixture of (i) 41.2 parts of an organosilicon resin composed of $Me_3SiO_{\frac{1}{2}}$ units and $SiO_{4/2}$ units in the ratio of 0.6 $Me_3SiO_{\frac{1}{2}}$ units to 1 $SiO_{4/2}$ unit: (ii) 41.2 parts of a polymer having the average formula $Me_3SiO(MeHSiO)_{35}SiMe_3$; and 17.6 parts of xylene was charged to a vessel provided with a stirrer.

This mixture, with continuous stirring, was heated to a temperature of 150 degrees Centigrade. The pressure in the vessel was gradually reduced to a value between 40 mm and 50 mm Hg. Heating under reduced pressure was continued for approximately 2 hours. During this time, volatilized xylene was removed and condensed in a reservoir separate from the vessel containing the mixture. After 2 hours, the reaction product was recovered. It was substantially solvent free liquid organosilicon resin.

A composition of this invention was prepared by mixing 300 parts of the above-prepared organosilicon resin, 100 parts of a vinyl-terminated polydimethylsiloxane having a viscosity of approximately 35,000 centipoise and 750 dimethylsiloxy units per molecule; 1.48 parts of an inhibitor such as 3,5-dimethyl-1-hexyn-3-ol, 0.5 parts of a catalyst prepared by reacting chloroplantinic acid with divinyltetramethyldisiloxane according to the method of U.S. Pat. No. 3,419,593, 38.9 parts of a silicone resin composed of $Me_2ViSiO_{\frac{1}{2}}$ units, $Me_3SiO_{\frac{1}{2}}$ units and $SiO_{4/2}$ units in the ratio of 0.15:0.6:1, and 155.6 parts of a mixture of polymethylvinylcyclosiloxanes having from 4 to 10 silicon atoms per molecule. The function of the inhibitor is to prevent the reaction of the catalyst with the silicone materials prior to removal of the inhibitor.

EXAMPLE III (Formulation C)

A composition of this invention was prepared by mixing 33.3 parts of the above-prepared organosilicon resin, 100 parts of the vinyl-terminated polydimethylsiloxane described in Example II, 0.167 parts of 3,5-dimethyl-1-hexyn-3-ol, 0.5 parts of the catalyst described in Example II, 38.9 parts of the silicone resin composed of Me$_2$ViSiO$_{\frac{1}{2}}$ units, Me$_3$SiO$_{\frac{1}{2}}$ units and SiO$_{4/2}$ units described in Example II, and 51.85 parts of polymethylvinylcyclosiloxanes having from 4 to 10 silicon atoms per molecule.

EXAMPLE IV (Formulation B)

A composition of this invention was prepared by mixing 100 parts of the above-prepared organosilicon resin, 0.5 parts of 3,5-dimethyl-1-hexyn-3-ol, 0.13 parts of the catalyst described in Example II, and 33.3 parts of polymethylvinylcyclosiloxanes having from 4 to 10 silicon atoms per molecule.

EXAMPLE V (Formulation D)

A composition of this invention was prepared by mixing 100 parts of methoxy terminated, polydimethylsiloxane polymers with methyl silsesquioxanes containing a monomethyl to dimethyl polysiloxane ration of 3:1 and containing 21.1 weight percent methoxy with 3 parts of tetrabutyltitanate catalyst.

It will be apparent from the foregoing that many other variations and modifications may be made in the structures, compounds, compositions, articles of manufacture, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. A gasket comprising a nonwoven sheet material, and a coating composition on at least one side of the nonwoven wheet material, the coating composition being a reaction product of a vinyl functional polydimethylsiloxane, a trimethylsiloxy silica terpolymer, and a reactive diluent, the reactive diluent being a vinyl cyclic siloxane having the formula (QViSiO)$_n$ wherein n is an integer of from three to five, Q is methyl, phenyl, or hexenyl, and Vi is vinyl.

2. A gasket according to claim 1 wherein the reactive diluent includes combinations of vinyl cyclic siloxane timer, tetramer, and pentamer.

3. A gasket according to claim 2 wherein the ratio of the vinyl component of the coating composition to silica is 1:3, and the coating composition has a viscosity less than about one thousand centipoise measured at twenty-five degrees Centigrade.

4. A gasket according to claim 2 wherein the coating composition has a viscosity less than about four hundred centipoise measured at twenty-five degrees Centigrade.

5. A gasket according to claim 2 wherein the ratio of the vinyl component of the coating composition to silica is 3:1, and the viscosity of the coating composition is in excess of about five thousand centipoise measured at twenty-five degrees Centigrade.

6. A gasket according to claim 1 wherein the reaction product includes (i) a resinous polymeric siloxane containing silicon-bonded hydroxyl radicals and consisting essentially of R$_3$SiO$_{\frac{1}{2}}$ siloxane units and SiO$_{4/2}$ siloxane units wherein the ratio of the number of said R$_3$SiO$_{\frac{1}{2}}$ siloxane units to the number of said SiO$_{4/2}$ siloxane units has a value of from 0.6/1 to 0.9/1 and each R denotes, independently, a monovalent hydrocarbon radical, (ii) an organohydrogenpolysiloxane wherein each organic radical is, independently, a monovalent hydrocarbon radical, there being an average of at least one silicon-bonded hydrogen radical per molecule of said organohydrogenpolysiloxane, and (iii) a polydiorganosiloxane having the formula $$ZR'''_2SiO(R'''_2SiO)_cSiR'''_2Z$$

wherein Z denotes hydroxyl or R''' and each R''' denotes independently, a monovalent hydrocarbon radical, there being an average of at least two vinyl radicals or silicon-bonded hydroxyl radicals per molecule and c has a value sufficient to provide a viscosity of from 0.1 to 10,000 Pa.s at twenty-five degrees Centigrade for the polydiorganosiloxane.

7. A gasket according to claim 6 wherein both sides of the nonwoven sheet material are coated with the coating composition.

8. A gasket according to claim 7 wherein the coated nonwoven sheet material is cured.

9. A gasket according to claim 8 wherein the reaction product includes a catalyst and an inhibitor.

10. A gasket according to claim 9 wherein the coated, cured, nonwoven sheet material contains from about one to about fifteen percent by weight of the coating composition based on the total weight of the gasket nonwoven sheet material.

11. A coating composition for nonwoven sheet materials comprising a reaction product of (i) a reactive diluent, (ii) a resinous polymeric siloxane containing silicon-bonded hydroxyl radicals and consisting essentially of R$_3$SiO$_{\frac{1}{2}}$ siloxane units and SiO$_{4/2}$ siloxane units wherein the ratio of the number of said R$_3$SiO$_{\frac{1}{2}}$ siloxane units to the number of said SiO$_{4/2}$ siloxane units has a value of from 0.6/1 to 0.9/1 and each R denotes, independently, a monovalent hydrocarbon radical, (iii) an organohydrogenpolysiloxane wherein each organic radical is, independently, a monovalent hydrocarbon radical, there being an average of at least one silicon-bonded hydrogen radical per molecule of said organohydrogenpolysiloxane, and (iv) a polydiorganosiloxane having the formula $$ZR'''_2SiO(R'''_2SiO)_cSiR'''_2Z$$

wherein Z denotes hydroxyl or R''' and each R''' denotes independently, a monovalent hydrocarbon radical, there being an average of at least two vinyl radicals or silicon-bonded hydroxyl radicals per molecule and c has a value sufficient to provide a viscosity of from 0.1 to 10,000 Pa.s at twenty-five degrees Centigrade for the polydiorganosiloxane, the reactive diluent being a methyl vinyl cyclic siloxane having the formula (MeViSiO)$_n$ wherein n is an integer of from three to five, Me is methyl, and Vi is vinyl.

12. The coating composition of claim 11 wherein the reactive diluent includes combinations of cyclic siloxane trimer, tetramer, and pentamer.

13. The coating composition of claim 12 wherein the ratio of the vinyl component of the reaction product to silica is 1:3, and the reaction product has a viscosity less than about one thousand centipoise measured at twenty-five degrees Centigrade.

14. The coating composition of claim 12 wherein the reaction product has a viscosity less than about four hundred centipoise measured at twenty-five degrees Centigrade.

15. The coating composition of claim 12 wherein the ratio of the vinyl component of the reaction product to silica is 3:1, and the viscosity of the reaction product is in excess of about five thousand centipoise measured at twenty-five degrees Centigrade.

16. A method of rendering a gasket leak resistant comprising a forming a gasket from a nonwoven sheet material, applying to at least one side of the nonwoven sheet material a coating composition, the coating composition being a reaction product of a vinyl functional polydimethylsiloxane, a trimethylsiloxy silica terpolymer, and a reactive diluent, the reactive diluent being a methyl vinyl cyclic siloxane having the formula $(MeViSiO)_n$ wherein n is an integer of from three to five, Me is methyl, and Vi is vinyl.

17. A method according to claim 16 wherein the reaction product includes (i) a resinous polymeric siloxane containing silicon-bonded hydroxyl radicals and consisting essentially of $R_3SiO_{\frac{1}{2}}$ siloxane units and $SiO_{4/2}$ siloxane units wherein the ratio of the number of said $R_3SiO_{\frac{1}{2}}$ siloxane units to the number of said $SiO_{4/2}$ siloxane units has a value of from 0.6/1 to 0.9/1 and each R denotes, independently, a monovalent hydrocarbon radical, (ii) an organohydrogenpolysiloxane wherein each organic radical is, independently, a monovalent hydrocarbon radical, there being an average of at least one silicon-bonded hydrogen radical per molecule of said organohydrogenpolysiloxane, and (iii) a polydiorganosiloxane having the formula $$ZR'''_2SiO(R'''_2SiO)_cSiR'''_2Z$$

wherein Z denotes hydroxyl or R''' and each R''' denotes independently, a monovalent hydrocarbon radical, there being an average of at least two vinyl radicals or silicon-bonded hydroxyl radicals per molecule and c has a value sufficient to provide a viscosity of from 0.1 to 10,000 Pa.s at twenty-five degrees Centigrade for the polydiorganosiloxane.

18. A method according to claim 16 wherein the reactive diluent includes combinations of cyclic siloxane trimer, tetramer, and pentamer.

19. A method according to claim 18 wherein the ratio of the vinyl component of the coating composition to silica is 1:3, and the coating composition has a viscosity less than about one thousand centipoise measured at twenty-five degrees Centigrade.

20. A method according to claim 18 wherein the coating composition has a viscosity less than about four hundred centipoise measured at twenty-five degrees Centigrade.

21. A method according to claim 18 wherein the ratio of the vinyl component of the coating composition to silica is 3:1, and the viscosity of the coating composition is in excess of about five thousand centipoise measured at twenty-five degrees Centigrade.

22. A method according to claim 18 including the step of coating both sides of the nonwoven sheet material with the coating composition.

23. A method according to claim 22 including the step of curing the coated nonwoven sheet material.

24. A method according to claim 23 wherein the reaction product includes a catalyst and an inhibitor.

25. A method according to claim 24 wherein the coated, cured, nonwoven sheet material contains from about one to about fifteen percent by weight of the coating composition based on the total weight of the gasket nonwoven sheet material.

26. A gasket comprising a nonwoven sheet material, and a coating composition on at least one side of the nonwoven sheet material, the coating composition being a mixture of a methyl terminated polydimethylsiloxane polymer, a methyl silsesquioxane containing a monomethyl to dimethyl polysiloxane ratio of 3:1, and a catalyst.

27. A gasket according to claim 26 wherein both sides of the nonwoven sheet material are coated with the coating composition.

28. A gasket according to claim 27 wherein the coated nonwoven sheet material is cured.

29. A gasket according to claim 28 wherein the coated, cured, nonwoven sheet material contains from about one to about fifteen percent by weight of the coating composition based on the total weight of the gasket nonwoven sheet material.

30. A method of rendering a gasket leak resistant comprising forming a gasket from a nonwoven sheet material, applying to at least one side of the nonwoven sheet material a coating composition, the coating composition being a mixture of a methoxy terminated polydimethylsiloxane polymer, a methyl silsesquioxane containing a monomethyl to dimethyl polysiloxane ratio of 3:1, and a catalyst.

31. A method according to claim 30 including the step of coating both sides of the nonwoven sheet material with the coating composition.

32. A method according to claim 31 including the step of curing the coated nonwoven sheet material.

33. A method according to claim 32 wherein the coated, cured, nonwoven sheet material contains from about one to about fifteen percent by weight of the coating composition based on the total weight of the gasket nonwoven sheet material.

* * * * *

UNITED STATES PATENT AND TRADEMARK OFFICE
CERTIFICATE OF CORRECTION

PATENT NO. : 4,865,911
DATED : September 12, 1989
INVENTOR(S) : Jeremy J. Mathers It is certified that error appears in the above-identified patent and that said Letters Patent is hereby corrected as shown below:

Column 2, line 10, change "311-325] of" to --311-325] of--;

Column 2, line 35, change "FIGURESS" to --FIGS.--.

Column 2, line 35 change "1band" to --1b and--.

Column 8, line 60 change "20" to --320--.

Column 9, line 22, change "4.4.11] which" to --4.4.11 which--.

Claim 7, column 10, line 41, change "clam" to --claim--.

Claim 10, column 10, line 52 change "2benzo-" to --2-benzo- --.

Signed and Sealed this

Twenty-fifth Day of September, 1990

*Attest:*

HARRY F. MANBECK, JR.

*Attesting Officer*   *Commissioner of Patents and Trademarks*